United States Patent
Reid et al.

(10) Patent No.: US 10,852,078 B2
(45) Date of Patent: Dec. 1, 2020

(54) DROPLET HEAT EXCHANGE SYSTEMS AND METHODS

(71) Applicant: Massachusetts Institute of Technology, Cambridge, MA (US)

(72) Inventors: Jessica Reid, Chelmsford, MA (US); Mark Bury, Acton, MA (US); Conor Doyle, Sherborn, MA (US); William Kammerer, Leominster, MA (US); William Flaherty, Dunstable, MA (US); Ryan Fontaine, Waltham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 9 days.

(21) Appl. No.: 16/374,964

(22) Filed: Apr. 4, 2019

(65) Prior Publication Data
US 2020/0318918 A1 Oct. 8, 2020

(51) Int. Cl.
*F28F 25/02* (2006.01)
*F28C 1/16* (2006.01)
*F28D 3/04* (2006.01)

(52) U.S. Cl.
CPC ............... *F28F 25/02* (2013.01); *F28C 1/16* (2013.01); *F28D 3/04* (2013.01)

(58) Field of Classification Search
CPC .. F28F 25/02; F28F 25/06; F28F 25/04; F28F 25/00; F28D 3/04; F28C 1/16
USPC ........................................................ 165/115
See application file for complete search history.

(56) References Cited

U.S. PATENT DOCUMENTS

| | | | | |
|---|---|---|---|---|
| 4,734,109 A * | 3/1988 | Cox | ........................... | B01F 5/02 95/189 |
| 5,291,943 A * | 3/1994 | Dhir | ........................... | F28D 3/04 138/38 |
| 6,331,195 B1 * | 12/2001 | Faust | ..................... | B01D 45/16 55/396 |

(Continued)

OTHER PUBLICATIONS

Bates, Stephen C., "High Altitude UAV Droplet Heat Exchanger", Thoughtventions Unlimited LLC, Retrieved Jun. 13, 2019 from<http://www.tvu.com/PHAltUAVDHXweb.html>, (22 pages).

(Continued)

*Primary Examiner* — Jon T. Schermerhorn, Jr.
(74) *Attorney, Agent, or Firm* — Nutter McClennen & Fish LLP

(57) ABSTRACT

A droplet heat exchange system is provided for that includes a heat exchange chamber, at least one injector, and at least one swirler. The chamber is configured to have gas flow through it. The injector can be configured to dispense liquid droplets into the chamber for thermal energy exchange with gas flowing through the chamber. The swirler can disposed within the chamber and can have a body configured to form a spiral gas flow that pushes liquid droplets from the injector, radially outward as gas flows across the body, thereby separating the liquid droplets from the gas flowing across the body and forming a liquid film along an inner wall of the chamber. The collector can be in fluid communication with the heat exchange chamber and configured to collect the liquid film after thermal energy exchange. The collector can be configured to direct at least some of the collected liquid film to the injector for subsequent use.

20 Claims, 12 Drawing Sheets

(56) References Cited

U.S. PATENT DOCUMENTS

| | | | |
|---|---|---|---|
| 8,210,506 B1* | 7/2012 | Ellis | F28C 1/06 |
| | | | 261/118 |
| 8,771,524 B2* | 7/2014 | Vorage | B01F 3/0861 |
| | | | 210/788 |
| 2010/0132926 A1* | 6/2010 | Paxton | B01D 1/065 |
| | | | 165/109.1 |

OTHER PUBLICATIONS

Flaherty, William et al. "Droplet Heat Exchanger: A Novel Thermal Management Device," AIAA Aviation Forum, 2018 Joint Thermophysics and Heat Transfer Conference, Jun. 25-29, 2018 (9 pages).

* cited by examiner

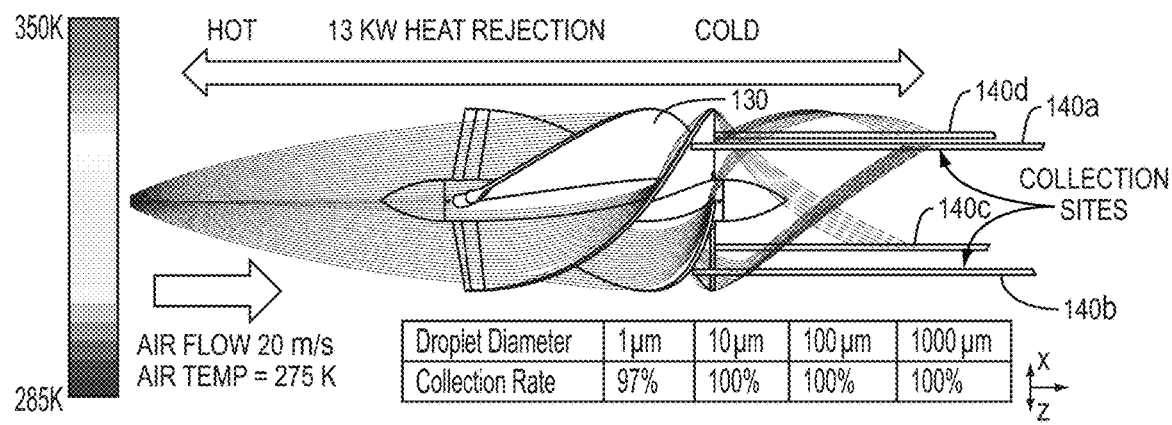
FIG. 5
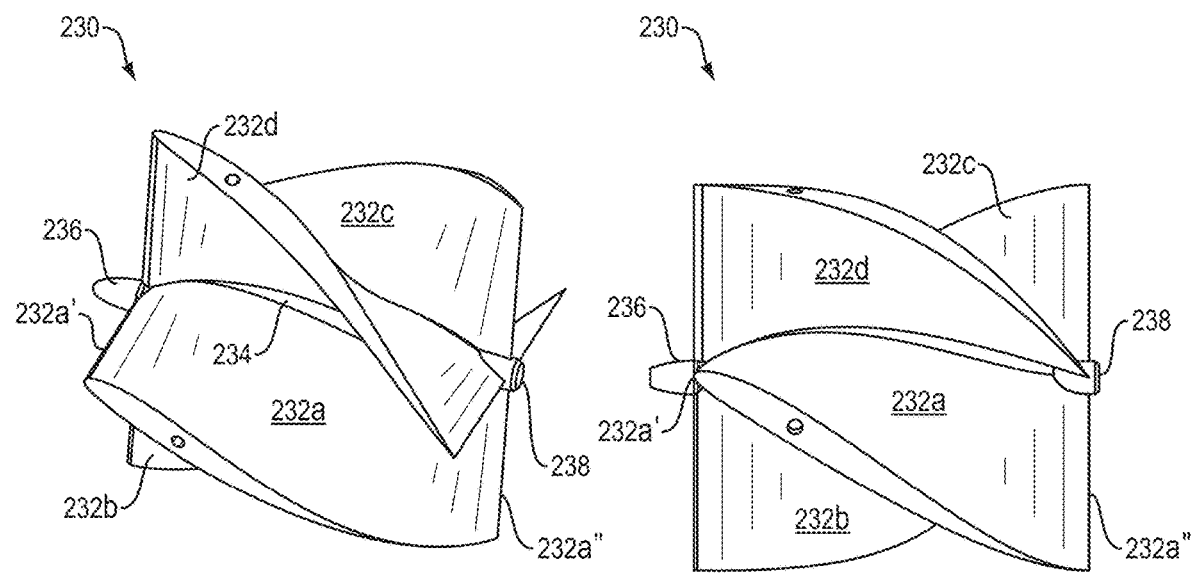
FIG. 6A
FIG. 6B

US 10,852,078 B2

DROPLET HEAT EXCHANGE SYSTEMS AND METHODS

GOVERNMENT RIGHTS

This invention was made with Government support under Grant No. FA8702-15-D-0001 awarded by the U.S. Air Force. The Government has certain rights in the invention.

FIELD

The present disclosure relates to systems, devices, and methods for thermal energy exchange, and specifically to droplet heat exchange systems, and related methods thereof, having improved thermal energy exchange efficiency and droplet collection rates.

BACKGROUND

Heat exchangers are used for thermal management of systems that generate and/or dissipate heat during operation. Heat exchangers can be used to transfer heat between different objects or mediums, such as between a solid object and a fluid or between two or more fluids. One example of a heat exchanger is a finned heat exchanger.

FIG. 1A is a schematic illustration of a conventional finned heat exchanger 10. As shown, a working fluid (e.g., water or other liquid) flows through one or more tubes 12 coupled to a set of plates or fins 14. Heat is transferred from the working fluid, through the heat transfer interface materials of the tubes 12 and fins 14, and is then rejected to cooler air passing between the tubes and fins. Because the tubes 12 and fins 14 must be thermally conductive and structurally supportive, the heat transfer interface materials are typically made of heavy, thermally conductive materials like metals.

One way to improve the heat rejection performance of a finned heat exchanger is to increase the flow rate of the working fluid and the cold air through the exchanger. However, to accommodate the increased flow rates, generally the size of the tubes and fins must also be increased, resulting in a corresponding increase in the overall size and mass of the exchanger. For example, in some aircraft systems, finned heat exchangers that are used for thermal management of high power payloads can have a mass equal to 50% or more of the total mass of such payloads. Accordingly, the volume and mass of a finned heat exchanger for thermal management can be a limiting factor in design and performance of the aircraft and its payload.

Droplet heat exchangers (DHX), such as linear DHX, have been considered for use in providing thermal management for various platforms or systems. For example, FIG. 1B is a schematic illustration of a conventional linear DHX 30. As shown, the linear DHX 30 includes an air duct 32 that guides a flow of cold air from an inlet 34 to an outlet 36. At the injector zone 32a of the duct 32, a working fluid is sprayed into the air flow. Heat from the droplets is transferred directly to the cold air while flowing through the heat transfer zone 32b of the duct 32. At the collection zone 32c, some of the cooled droplets separate from the air flow and collect along a ramped wall 38 of the duct 32. The ramped wall 38 allows the collected droplets to form a film and flow back towards the injection zone 32a for recirculation as the airstream exits the duct 32 through the outlet 36. However, conventional linear DHX are typically not suitable for use in at least some systems, such as current aircraft systems, due, at least in part, to their low droplet collection rates, among other deficiencies.

Accordingly, there is a need for droplet heat exchange systems, and related methods, that have improved thermal energy exchange efficiency and droplet collection rates.

SUMMARY

The present disclosure is generally related to droplet heat exchange (DHX) systems (the term DHX and DHX systems may be used interchangeably herein) and represents improvements over the designs of conventional DHX systems. The provided for embodiments of a DHX system can be included as a subsystem in aircraft or other aerial systems to reject heat generated or dissipated through the operation(s) of one or more of the aerial subsystems, devices, or components thereof. Alternatively or additionally, the provided for embodiments of a DHX system can be adapted to reject heat in ground systems without departing from the spirit of the present disclosure. As discussed in greater detail below, the provided for embodiments of a DHX system can improve thermal energy exchange efficiency and droplet collection rates and have less mass as compared to traditional heat exchangers.

In one exemplary embodiment of a DHX system, the DHX system includes a heat exchange chamber, at least one injector, at least one swirler (sometimes referred to herein as a "momentum separator"), and at least one collector. The heat exchanger chamber is configured to have gas flow into the chamber through at least one inlet and flow out of the chamber through at least one outlet. The at least one injector is disposed within the heat exchange chamber, and is configured to dispense liquid droplets into the heat exchange chamber for thermal energy exchange with gas that flows through the heat exchange chamber. The at least one swirler is disposed within the heat exchange chamber and has a body that is configured to form a spiral gas flow that pushes liquid droplets from the at least one injector radially outward as gas flows across the body. This causes the liquid droplets to be separated from the gas flowing across the body of the swirler and form a liquid film along an inner wall of the chamber. The swirler can have a helical-shaped body. The at least one collector is in fluid communication with the heat exchange chamber, and is configured to collect the liquid film after thermal energy exchange occurs between the liquid droplets and gas that flows through the heat exchange chamber. The at least one collector is further configured to direct at least some of the collected liquid film to the at least one injector for subsequent use. In some embodiments, a pump can be used to suction the collected liquid film for recirculation.

In some embodiments, one or more of the inlet, outlet, and the chamber can be made of a flexible structure that allows mass flow rate of the gas to vary as desired for performance. The flexible structure can be made of lightweight materials. In some embodiments, one or more of the inlet, outlet, or the chamber can comprise a non-thermally conductive material that deforms to modulate a gas flow rate and/or other operating parameter. In certain embodiments, one or more of the inlet, the outlet, or the heat exchange chamber can comprise a non-thermally conductive material that deforms in response to a change in a pressure or other operating condition to maintain a gas flow rate or other target operating parameter. In certain embodiments, one or more of the inlet, the outlet, or the heat exchange chamber can comprise a non-thermally conductive material that collapses for storage. In some embodiments, grooves and/or other surface features can be defined in one or more surfaces of at least one of the heat exchange chamber, the at least one swirler, or the at least one collector to guide liquid film.

In some embodiments, the body of the at least one swirler can be stationary. The body of the at least one swirler can be configured such that liquid droplets that are pushed radially outward as gas flows across the body have varying droplet sizes. The droplet sizes can be approximately in the range of about 1 micrometer in diameter to about 1000 micrometers in diameter. The body of the at least one swirler can include an elongated body having one or more twisted vanes that extend radially outward from the elongated body. The one or more twisted vanes can be shaped to form a spiral gas flow as gas flows through the at least one swirler. The one or more twisted vanes can have an airfoil-shaped cross section.

The DHX system can include any number of swirlers. For example, a swirler can be disposed between the at least one injector and the at least one collector. A swirler can be disposed between the inlet of the heat exchange chamber and the at least one injector. In some embodiments, a first swirler is disposed between an inlet of the heat exchange chamber and the at least one injector, and a second swirler is disposed between the at least one injector and the at least one collector.

An injector can protrude from a central axis of a swirler. An injector can be integrated into a swirler and configured to dispense liquid droplets through injection ports defined in the body of the swirler. An injector can protrude from the inlet of the heat exchange chamber. An injector can protrude from the walls of the heat exchange chamber.

A collector can include an elongated body and a fluid channel defined in the body of the collector. The fluid channel can be in communication with an interior of the chamber through one or more slots defined in the chamber. The collector can be configured to be disposed on an outer surface of the chamber such that the fluid channel extends longitudinally between the swirler and the outlet of the chamber. In some embodiments, multiple collectors can be disposed substantially around the circumference of the chamber.

A collector can include a ring-shaped body having a tapered portion. The tapered portion can be configured to allow liquid droplets of varying droplet sizes to transition smoothly from the spiral gas flow into a liquid film that forms along an inner surface of the tapered portion of the collector. A leading edge of the tapered portion can have a larger diameter than a trailing edge of the tapered portion. The liquid droplets can transition smoothly from the spiral gas flow into the liquid film along the tapered portion from the leading edge to the trailing edge with increasing droplet size. The collector can include one or more output ports in fluid communication with a pump. The liquid film can be drawn out of the collector through the one or more output ports into the pump. The ring-shaped body can include an opening configured to selectively open and close based on flow conditions of the droplet heat exchange system. In some embodiments, the heat exchange system can be integrated into an aircraft.

One exemplary method of droplet heat exchange includes directing a flow of gas into a heat exchange chamber, and dispensing liquid droplets into the heat exchange chamber to cause thermal energy exchange between the liquid droplets and the gas in the heat exchange chamber. The method further includes causing a spiral flow of the gas and the liquid droplets in the heat exchange chamber that pushes the liquid droplets radially outward towards an inner wall of the heat exchange chamber as the gas and the liquid droplets pass through at least a portion of the heat exchange chamber, and collecting a liquid film that forms on the inner wall of the heat exchange chamber.

In some embodiments, the liquid droplets that are pushed radially outward towards the inner wall of the heat exchange chamber can have varying droplet sizes approximately in the range of about 1 micrometers in diameter to about 1000 micrometers in diameter. The heat exchanger chamber can have at least one swirler disposed therein. In some such embodiments, the method can include causing a spiral flow of the gas and the liquid droplets in the heat exchange chamber by forming a spiral gas flow as the gas flows across the at least one swirler.

The method can also include collecting the liquid droplets by collecting the liquid film that forms along a tapered portion of a collector that is in fluid communication with the heat exchange chamber. The liquid droplets can form along the tapered portion from a leading edge of the tapered portion to a trailing edge of the tapered portion with increasing droplet size. In some embodiments, the gas that is directed to flow into the heat exchange chamber is received from an aircraft. In some embodiments, a fluid other than a gas can be directed to flow into the heat exchange chamber. For example, in some embodiments, jet fuel or another working fluid in an aircraft can be used instead of air or other gas.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments:

FIG. 1A is a schematic illustration of an existing finned heat exchanger;

FIG. 1B is a schematic illustration of an existing droplet heat exchanger;

FIG. 2A is a perspective view of one exemplary embodiment of a droplet heat exchange system including a heat exchange chamber that contains an injector, a swirler, and a segmented collector;

FIG. 2B is a side view of the droplet heat exchange system of FIG. 2A;

FIG. 3A is a perspective view of one exemplary embodiment of the swirler as viewed from the front of the droplet heat exchange system of FIG. 2A;

FIG. 3B is another perspective view of the swirler as viewed from the rear of the droplet heat exchange system of FIG. 2A;

FIG. 3C is a side view of the swirler of FIG. 3A;

FIG. 3D is a front view of the swirler of FIG. 3A;

FIG. 3E is a rear view of the swirler of FIG. 3A;

FIG. 4A is a perspective view of one exemplary embodiment of the segmented collector as viewed from the front of the droplet heat exchange system of FIG. 2A;

FIG. 4B is a side view of the segmented collector of FIG. 4A;

FIG. 4C is a rear view of the segmented collector of FIG. 4A;

FIG. 4D is a perspective view of one of the segmented collector of FIG. 4A;

FIG. 5 is a schematic illustration of an exemplary flow path of a field of droplets through the droplet heat exchange system of FIG. 2A;

FIG. 6A is a perspective view of another exemplary embodiment of a swirler suitable for use in the droplet heat exchange system of FIG. 2A;

FIG. 6B is a side view of the swirler of FIG. 6A;

DETAILED DESCRIPTION

Figure 1A:
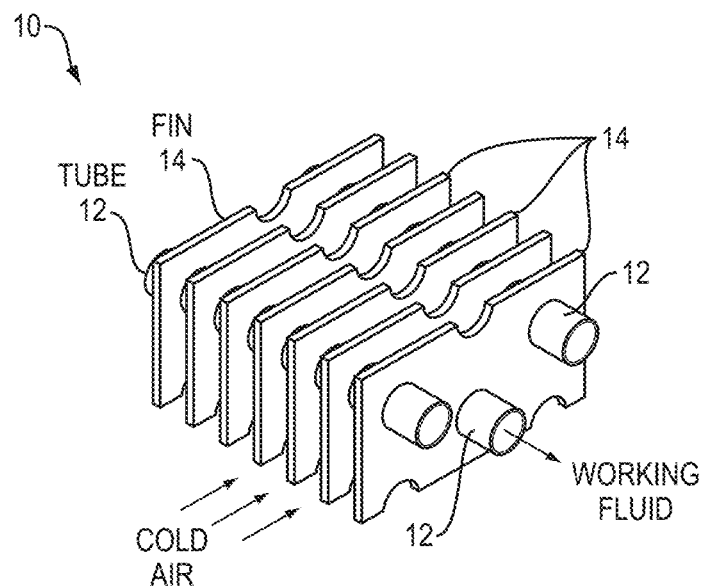
Figure 1B:
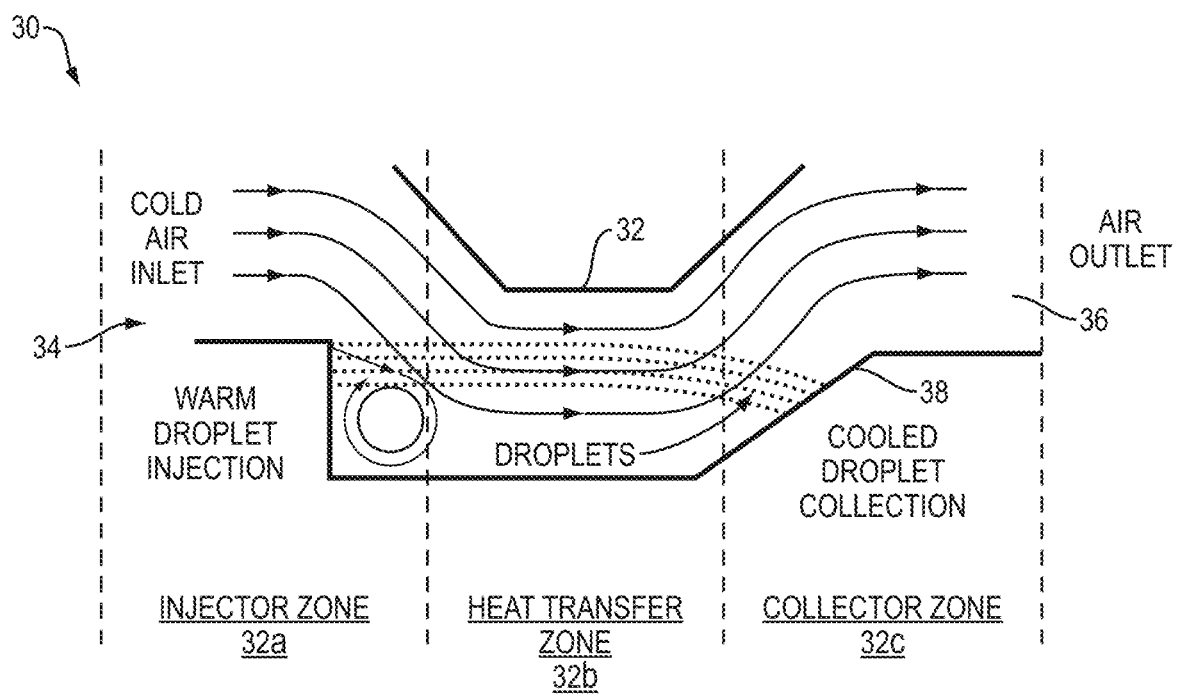

Certain exemplary embodiments will now be described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Sizes, shapes, locations, and/or relative spacing of the various components of the provided for embodiments of a droplet heat exchange system can depend on a variety of factors, including but not limited to gas flow rates, gas density, droplet flow rates, droplet size, operating power, operating temperature, working fluids, and user and/or design preferences.

In the present disclosure, like-numbered and/or like-named components of the embodiments generally have similar features and/or purposes, unless stated otherwise. Additionally, to the extent that linear or circular dimensions are used in the description of the disclosed devices and methods, such dimensions are not intended to limit the types of shapes that can be used in conjunction with such devices and methods. A person skilled in the art will recognize that an equivalent to such linear and circular dimensions can be easily determined for any geometric shape (e.g., references to widths and diameters being easily adaptable for circular and linear dimensions, respectively, by a person skilled in the art). Further, to the extent that terms are used in the disclosure to describe a direction, orientation, and/or relative position of the disclosed droplet heat exchange systems and components thereof and/or for performing a disclosed method of droplet heat exchange, such terms are not intended to be limiting. For example, a person skilled in the art will recognize that terms of direction, orientation, and/or relative position (e.g., leading, trailing, front, rear, etc.) can be used interchangeably depending, at least in part, on the perspective view of the user or other operator.

The present disclosure is generally related to droplet heat exchange (DHX) systems and provides for improvements over the designs of conventional DHX systems. The various embodiments of a DHX system provided for herein include a heat exchange chamber that includes a number of components configured to facilitate thermal energy exchange (e.g., heat transfer) between liquid droplets and gas that flow together through the chamber. The components can include, for example, at least one injector, at least one swirler, at least one inlet, at least one outlet, and at least one collector. The injector(s) can be configured to inject, spray, or otherwise dispense droplets of a working liquid into the chamber. The swirler(s) can have a helical-shaped body configured to form a spiral gas flow that can push the liquid droplets radially outward along a spiral path towards the inner wall of the chamber as air flows through the swirler(s). The working liquid can be water or other liquids available on a target platform, such as jet fuel on an aircraft.

By traversing a spiral path, liquid droplets can remain within the gas flow for longer residence times during which heat is transferred between droplets and gas. The longer residence times due to the spiral gas flow can improve the efficiency of heat transfer between the droplets and gas. As droplets approach the inner wall of the chamber, the inertia of the droplets can cause at least some of the droplets to separate from the spiral gas flow and form a liquid film along a section of the inner wall of the chamber. The collector(s) can be disposed at a designated location or locations to the rear of the swirler(s) to collect the liquid film after heat transfer and direct some of the liquid back to a pump for subsequent reuse.

Although the exemplary embodiments of a DHX system disclosed herein describe the transfer of heat from higher temperature droplets to lower temperature gas, a person skilled in the art will recognize that such embodiments can be used to effect a thermal energy exchange in the other direction, e.g., from higher temperature gas to lower temperature droplets.

The various embodiments of a DHX system disclosed herein can be included as a subsystem in an aircraft or other aerial systems to reject heat generated or dissipated through the operation(s) of one or more of the aerial subsystems, devices, or components thereof. Exemplary aircraft can include, without limitation, airplanes, helicopters, airship, unmanned aerial vehicles (UAVs), drones, or other machine adapted to fly. Although the disclosures provided for herein describe a particular application of the exemplary embodiments of a DHX system, namely rejection of heat from payloads in aircraft, a person skilled in the art will understand how such disclosures can be adapted to reject excess heat in other systems or platforms that are not aircrafts without departing from the spirit of the present disclosure. For example, the exemplary embodiments of the DHX system can be adapted for thermal management in ground systems, such as without limitation, vehicles (e.g., race cars), watercraft (e.g., high speed boats), wind turbines, cooling towers of nuclear power plants, and other machines capable of generating or having access to air flow.

Figure 2A:
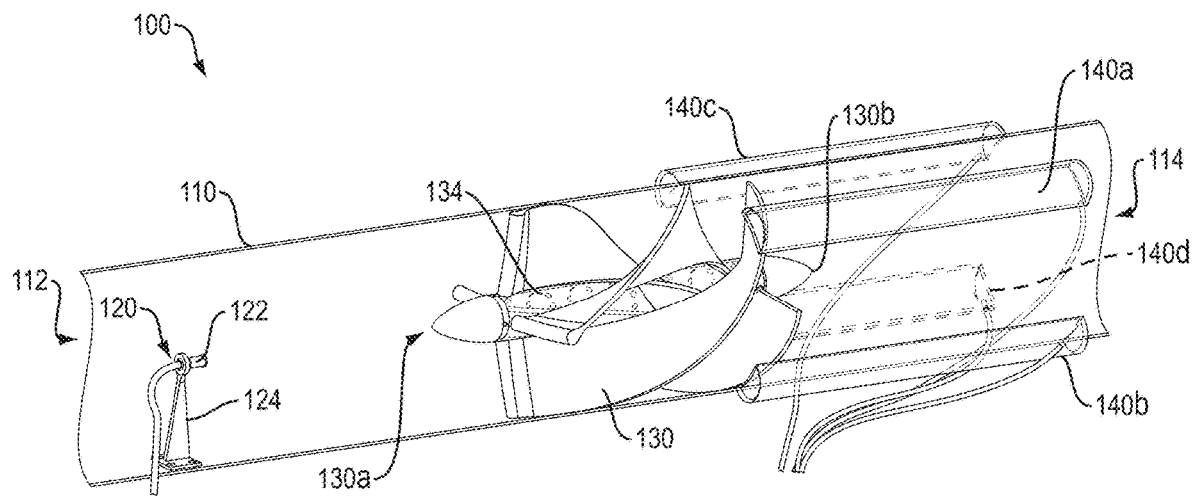
Figure 2B:
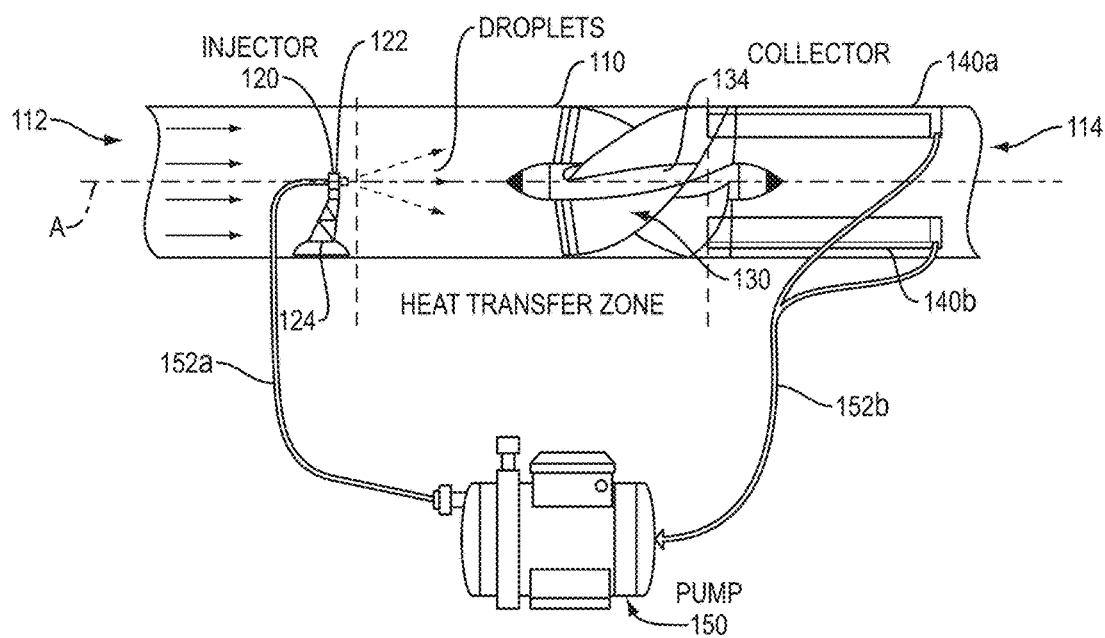

FIGS. 2A and 2B are perspective and side views, respectively, of one exemplary embodiment of a droplet heat exchange (DHX) system 100. As shown, the DHX system 100 includes a heat exchange chamber 110 that includes an injector 120, a swirler 130, and collectors 140a, 140b, 140c, and 140d (collectively, a segmented collector 140). In the illustrated embodiment, the heat exchange chamber 110 is a cylindrical shaped tube or duct having an inlet 112 and an outlet 114 defined at the opposing ends of the tube. A flow of air or other gas enters the chamber 110 through the inlet 112 and exits the chamber through the outlet 114. The inlet 112 and the outlet 114 can be configured to provide an air flow at a desired flow rate. The inlet 112 can be configured to facilitate an axial air flow into the chamber 110. Although the heat exchange chamber in the illustrated embodiment is a cylindrical shaped tube, the chamber can have any other suitable shape.

In some embodiments, the inlet 112, the outlet 114, and the chamber 110 can be rigid. Alternatively, one or more of the inlet 112, the outlet 114, and the chamber 110 can be can be made of a flexible material or structure to facilitate variable gas flow rates through the system 100. For example, in some embodiments, a flexible material can be a light-weight, non-thermally conductive material that can flex or deform to modulate a gas flow rate or other operating parameter of the system, such as but not limited to a vinyl or plastic tarp-like material and/or structure. For example, in some embodiments, the inlet 112, the outlet 114, and/or the chamber 110 can be configured to flex such that their respective diameter(s) can increase and decrease in response to changes in pressure or other operating conditions to maintain a desired flow condition. For example, the inlet 112, the outlet 114, and/or the chamber 110 can be configured to flex in response to changes in altitude, air pressure, air temperature, speed of the aircraft, or other operating condition to maintain a desired air flow rate. As yet a further example, the flexible material of the inlet 112, the outlet 114, and/or the chamber 110 can be collapsible for efficient storage and/or certain flight conditions. Alternatively, or additionally, the swirler 130 can be integrated directly into a collapsible chamber wall using shape memory materials that become rigid in response to certain flow conditions, application of an electrical current to the material, and/or at a specific temperature when the system reaches a target altitude. An example of a suitable shape memory material can include, without limitation, shape memory polymers that can change shape from a deformed state (e.g., a stowed state) to an original state (e.g., an un-stowed state in an operational configuration) when triggered by an external stimulus (e.g., electrical current or temperature change). A person skilled in the art, in view of the present disclosures, will understand suitable materials that would work. In some embodiments, the system 100 can be configured to collapse when not in use to improve aircraft/speed and maneuverability. A person skilled in the art will recognize other materials and/or configurations of the inlet 112, outlet 114, chamber 110, and swirler 130, and/or related components, that can be used to allow the system 100 to flex without departing from the spirit of the present disclosure.

In the illustrated embodiment, the injector 120 is a stand-alone device having a nozzle or spout 122 in fluid communication with an external pump 150 via a hose or other fluid tubing 152a. The pump 150 can be configured to supply the nozzle 120 with a flow of a liquid that is circulated through a system or platform to manage heat (not shown). The flow may be steady or vary based on the speed and/or altitude of aircraft and other factors. The nozzle 122 can discretize the flow of liquid from the pump 150 into a field of liquid droplets that can be sprayed into the chamber 110 for direct heat transfer with the air flowing through the chamber.

The nozzle 122 can be controlled to provide a desired flow rate and/or dispense an approximately even distribution of droplets into the chamber 110. In some embodiments, the nozzle 122 can be configured to dispense smaller droplet sizes that transfer heat faster than larger droplet sizes. For example, the nozzle 122 can be configured to spray droplets having small droplet sizes approximately in the range of about 1 micrometer in diameter to about 1000 micrometers in diameter. Thus, in such embodiments, the nozzle 122 can dispense droplets at desired flow rates sufficient to remove a desired amount of heat, and with smaller droplet sizes that facilitate faster heat transfers between droplets and surrounding air.

The nozzle 122 can be coupled to a support stand 124 that can be fixedly attached to the chamber 110 between the inlet 112 and the swirler 130. The height of the stand 124 can be configured to facilitate alignment of the nozzle 122 with a central axis A-A of the chamber 110 or other axial height within the chamber 110. The nozzle 122 can be spaced apart from the front 130*a* of the swirler 130 at a predetermined distance.

In some embodiments, the distance of the nozzle 122 from the inlet 112 (e.g., an air inlet) can be selected based on the desired operating speed and altitude of the aircraft. It can be desirable to place the nozzle 122 in the developed air flow to minimize turbulent effects on nozzle performance. In some embodiments, aircraft can have longer or shorter inlet ducts depending on placement of the inlet. The distance between the nozzle 122 and the swirler 130 can depend on several factors, including the type of nozzle used. A nozzle typically requires a certain distance to attain a well-developed field of droplets. Thus, placing the nozzle 122 too close to the swirler 130 can result in the nozzle spraying directly onto the swirler with limited development of a droplet field. Conversely, placing the nozzle 122 too far from the swirler can result in utilizing extra volume and unnecessarily producing a larger, heavier DHX with high pressure drops that reduce the efficiency of the system. Longer distances can be used if required for packaging in a specific aircraft.

Although a single nozzle 122 is shown in the illustrated embodiment, one or more nozzles can be disposed within the chamber 110 to spray a droplet field into the chamber at a desired flow rate. Although the injector 120 in the illustrated embodiment is a standalone device having a nozzle 122, the injector 120 can be any device capable of converting a flow of liquid into a field of liquid droplets sprayed or otherwise dispensed into the chamber 110. Alternatively, or additionally, in some embodiments the injector can be configured to dispense a droplet field into the chamber 130 by flowing jets of air over a thin film to produce droplets of desired diameters and thereby operate with significantly lower liquid operating pressures than those typically required by a nozzle.

In the illustrated embodiment, the swirler 130 is disposed between the injector 120 and the segmented collector 140. The swirler 130 can be fixedly attached to the chamber 110 such that the swirler is stationary. The swirler 130 can have a helical-shaped body that is configured to cause an axial air flow to swirl or otherwise transition into a cyclonic or otherwise spiral air flow. The spiral air flow formed by the helical-shaped body of the swirler 130 can push the liquid droplets radially outward along spiral paths or trajectories.

As the droplets traverse in spiral paths, the inertia of at least some of the droplets can cause them to separate from the spiral air flow and collect along the inner wall of the chamber 110. In some embodiments, such as described in more detail below with respect of FIGS. 3A-3E, 7A, and 7B, the helical-shaped body of the swirler 130 can include one or more twisted vanes or blades that extend radially outward from an elongated body or shaft.

In the illustrated embodiment, the collectors 140a, 140b, 140c, and 140d (collectively a segmented collector 140) are disposed in fluid communication with the chamber 100 and located at or near a rear portion 130b of the swirler 130. The segmented collector 140 is configured to skim or otherwise collect a liquid film that forms on the inner wall of the chamber 110 after separation of the liquid droplets from the air flow. The liquid collected by the segmented collector 140 can be directed back to the pump 150 via a hose or other fluid tubing 152b for recirculation through the system (not shown) and the heat exchange system 100. In some embodiments, such as described in more detail below with respect to FIGS. 4A-4D, each collector of the segmented collector 140 can include a semi-cylindrical body having a fluid channel that is in fluid communication with the chamber 110 and configured to skim a liquid film that flows or streams along the inner wall of the chamber. Other shapes, designs, and orientations are possible for the individual collectors of the segmented collector 140, and for the other various components of the system 100 described herein. Various sizes for the components of the system 100 can also be provided for in view of the present disclosures. Decisions such as shapes, designs, orientations, and sizes can be based, at least in part, on the shapes, designs, orientations, and sizes of the other components of the system 100, the desired or intended use of the system, and user, designer, and/or manufacturer preferences, among other factors.

FIGS. 3A-3E are schematic illustrations of one exemplary embodiment of the swirler 130 having a helical-shaped body. In the illustrated embodiment, the swirler 130 includes four vanes or blades 132a, 132b, 132c, and 132d (collectively vanes 132) that extend radially outward from a central elongated body or shaft 134. In some embodiments, the elongated shaft 134 can be a hollow tube. Each of the vanes 132 can have a rectangular or substantially rectangular planar body defined between a leading edge and a trailing edge of the vane. For example, as shown, the vane 132a has a leading edge 132a' and a trailing edge 132a"; the vane 132b has a leading edge 132b' and a trailing edge 132b"; the vane 132c has a leading edge 132c' and a trailing edge 132c"; and the vane 132d has a leading edge 132d' and a trailing edge 132d". In some embodiments, a nose cone 136 can be disposed at one end of the elongated shaft 134 to help guide the axial air flow towards the leading edges of the vanes 132. The nose cone 136 also provides the swirler 130 with a non-blunt front face that can reduce, if not eliminate, turbulence near the leading edge of the vanes that could diffract the droplet field around the vanes making them less effective for droplet separation and require a much longer spiral section to smooth the flow out so that the droplets follow a predictive path. Alternatively, or additionally, a nose cone 138 can be disposed at an opposite end of the elongated shaft 134 to help provide air flow control. The trailing edge nose cone 138 can provide a similar flow smoothing to minimize turbulence off the trailing edge of the vanes so that disruption of the droplets back into the air flow can be avoided.

Figure 3A:
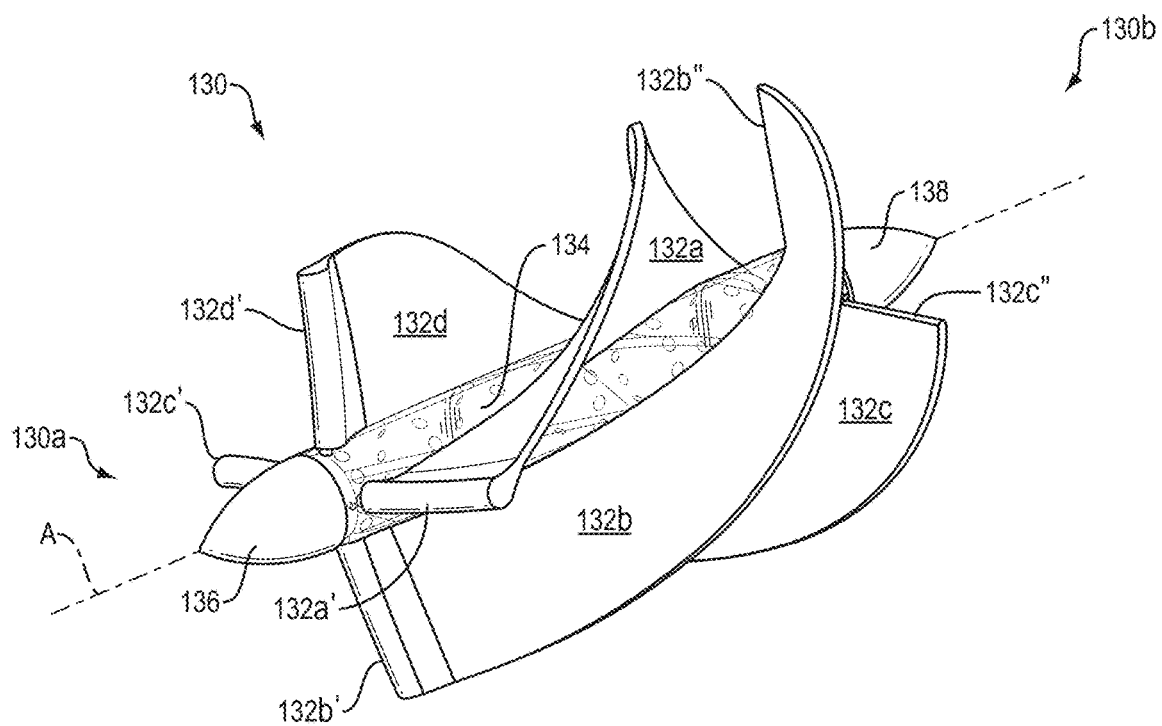
Figure 3B:
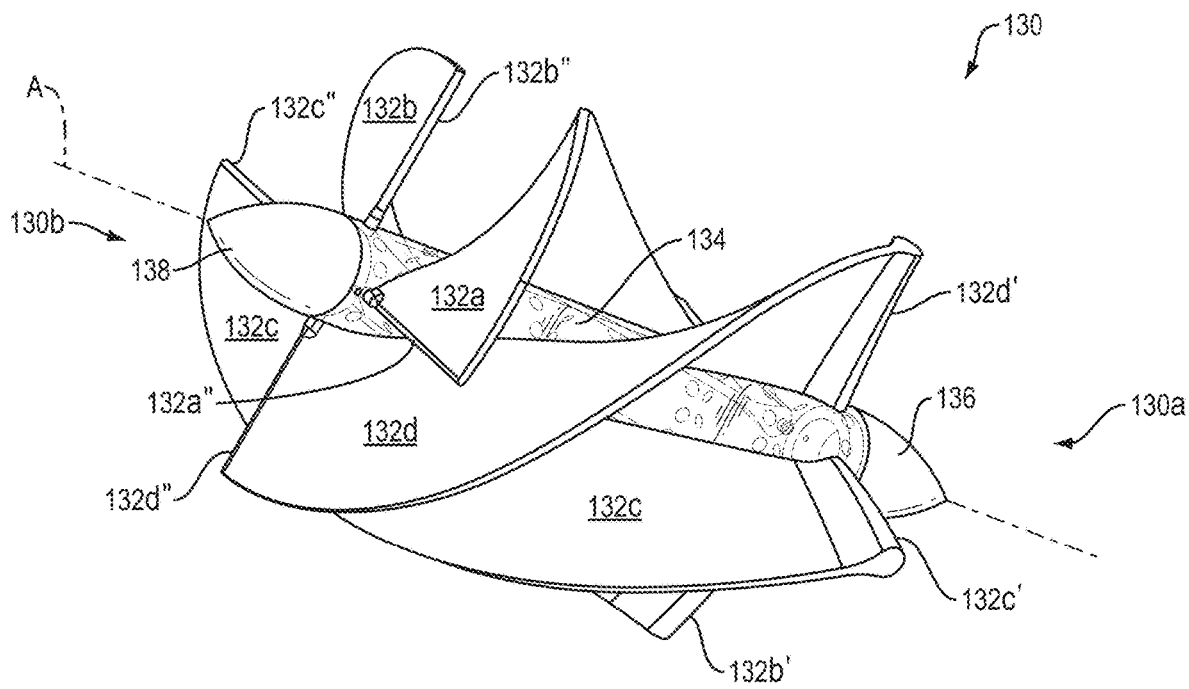
Figure 3C:
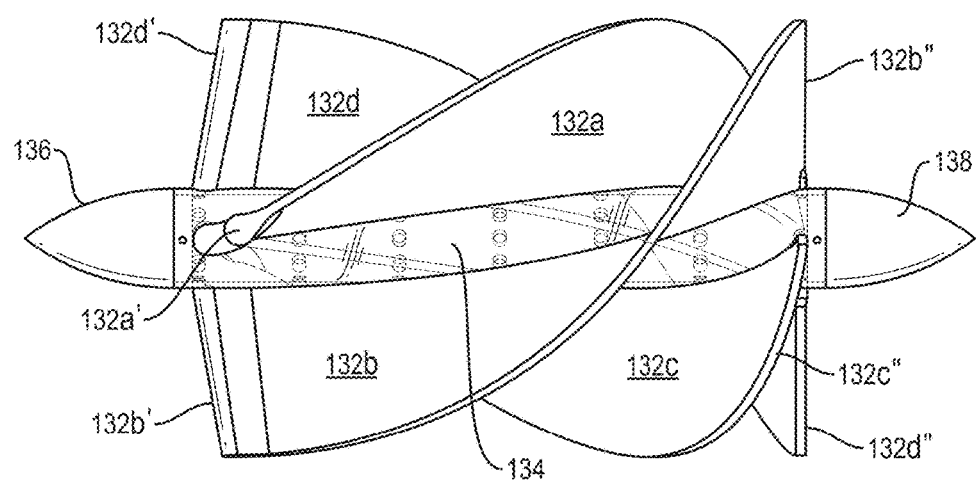
Figures 3D, 3E:
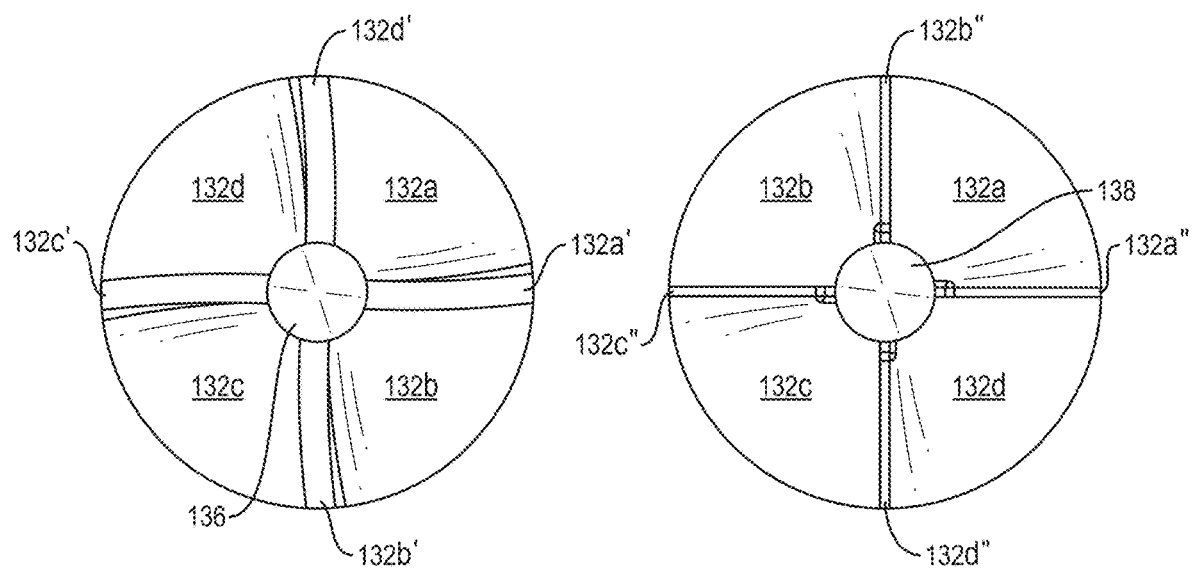
Figure 4A:
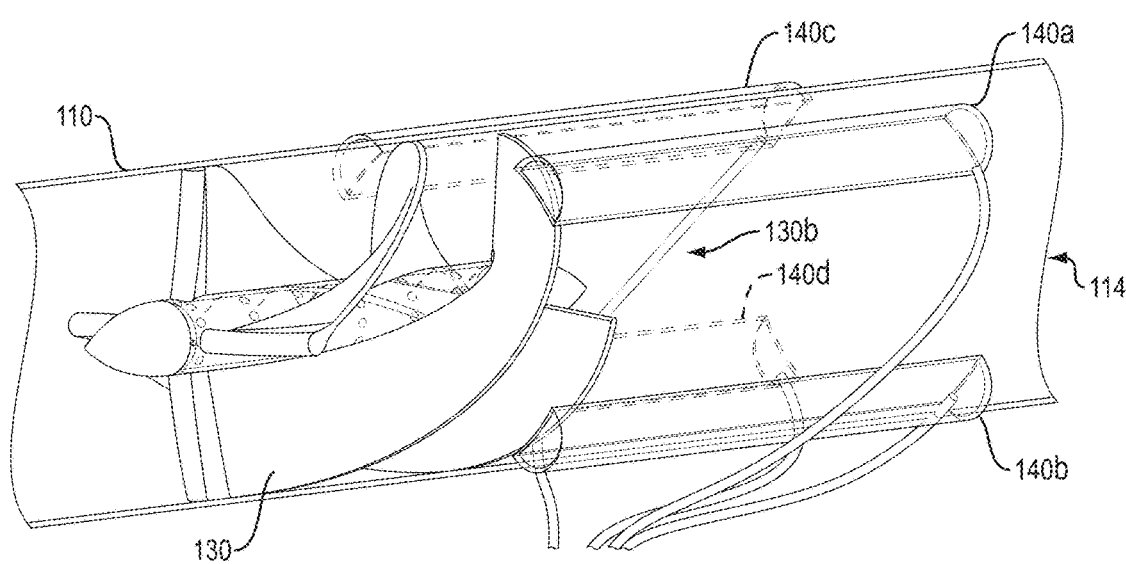
Figure 4B:
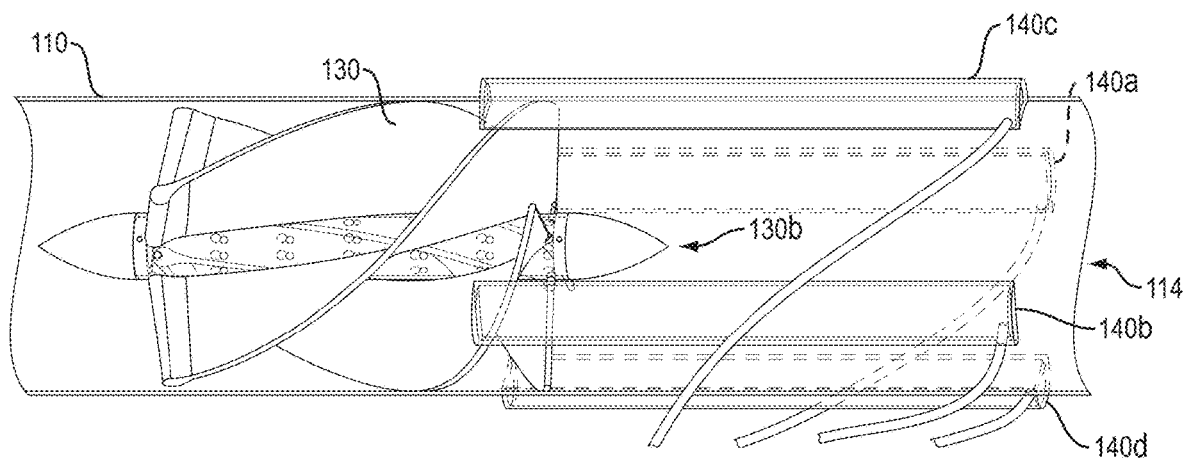
Figure 4C:
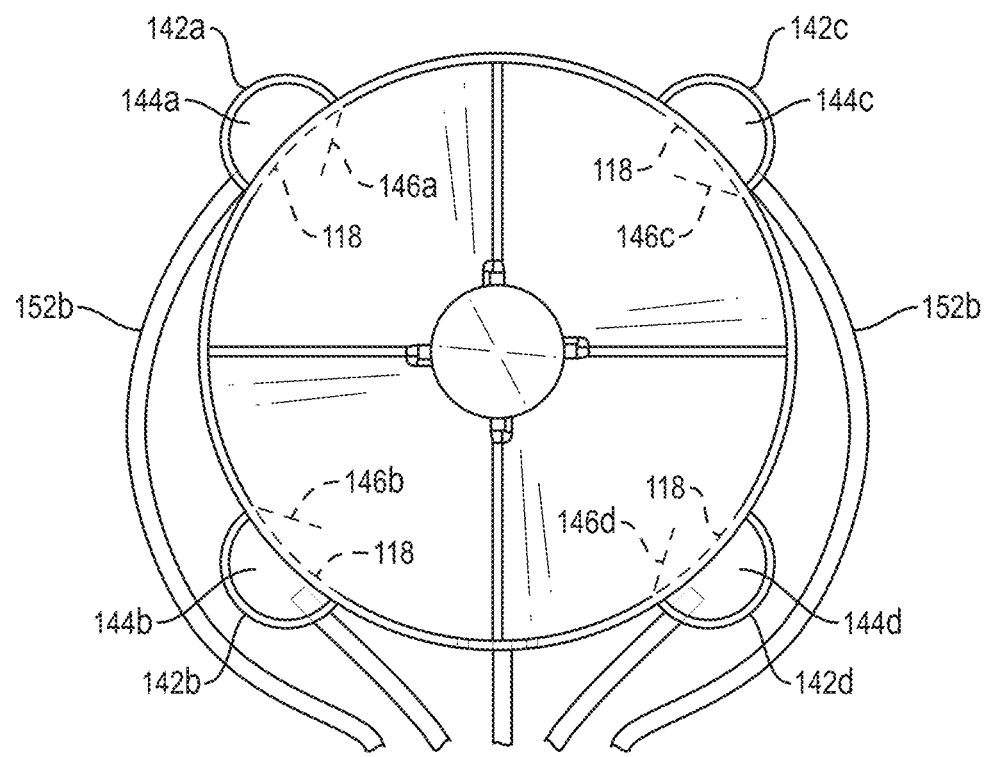
Figure 4D:
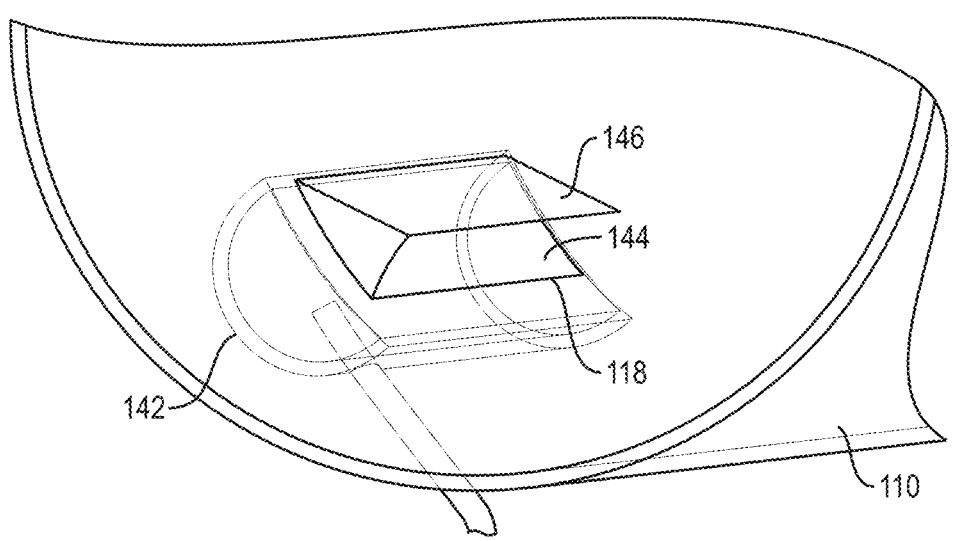

In the illustrated embodiment, the leading edges 132a', 132b', 132c', and 132d' of the vanes 132 can have a bulbous shape that tapers back towards a respective trailing edge 132a", 132b", 132c", and 132d" with a constant or substantially constant cross sectional thickness. For example, as shown in FIGS. 3A and 3B, the leading edges of the vanes 132 can be shaped in the form of an airfoil to control the air flowing around them, and thereby limit, if not avoid, air turbulence. In some embodiments, the leading edges of the vanes 132 can be shaped in the form of an airfoil defined according to one or more of the numerical codes set forth by the National Advisory Committee for Aeronautics (NACA), such as but not limited to NACA0012 which is a symmetric shape or a NACA4412 which is a cambered shape. A person skilled in the art will recognize that each shape produces a specific impact on the air flow and can be used to change the system performance of the DHX.

In the illustrated embodiment, the vanes 132 are disposed on the central elongated shaft 134 such that each vane is twisted about a central longitudinal axis A-A of the shaft. For example, as shown, the vanes 132 are twisted about the axis A-A of the central shaft 134 such that the position of the trailing edge of a vane is offset relative to the position of its leading edge by a rotation of approximately 180 degrees. As air flow overs the twisted vanes 132 of the swirler 130, the axial air flow entering the chamber 110 transitions into a spiral air flow. The spiral air flow formed by the airfoil-shaped body of the swirler 130 can push liquid droplets within the flow radially outward along spiral paths. As the droplets traverse in spiral paths, the inertia of at least some of the droplets can cause them to separate from the spiral air flow and collect as a liquid film along the inner wall of the chamber 110.

Heat rejection performance can depend on a various factors, including but not limited to, mass flow of the air, mass flow of the droplets, temperature of the air, and temperature of the droplets. In some embodiments, the length of the swirler 130 can be set at a desired length and vary the inlet mass flow to achieve a constant heat rejection performance of the system 100 over varying operating conditions. For example, where the heat exchange system 100 is operated in an aircraft at an altitude approximately in the range of about 20,000 feet to about 30,000 feet, the swirler 130 can have a length approximately in the range of about 9 inches to about 27 inches. In some embodiments, the system 100 can be configured to reject 13 kilowatts of heat.

Although the swirler 130 shown in the illustrated embodiment includes four vanes 132, the swirler can include more or less than four vanes. The vanes can be twisted about the axis A-A of the central shaft 134 such that the position of the trailing edge of a vane can be offset relative to the position of its leading edge by a rotation of about 180 degrees or, in some instances, more or less than 180 degrees. The vanes can have aligned leading or trailing edges or can have leading or trailing edges that are offset at a distance from each other. In some embodiment, the amount of rotation can depend on the air flow and acceptable pressure drop across the system.

FIGS. 4A-4D are schematic illustrations of one exemplary embodiment of the segmented collector 140 of the embodiment heat exchange system 100. In the illustrated embodiment, each of the constituent collectors, or collector components, 140a, 140b, 140c, and 140d of the segmented collector 140 includes a semi-cylindrical elongated body 142a, 142b, 142c, and 142d (collectively bodies 142) having a fluid channel 144a, 144b, 144c, and 144d (collectively fluid channels 144) that extends longitudinally therein. In some embodiments, the collectors 140a, 140b, 140c, and 104d can have a similar rotation to the swirler to match the shape of the liquid film flow across the chamber wall. The collectors 140 can be disposed on an outer surface of the chamber 110 such that the fluid channels 144 can extend longitudinally between the rear portion 130b of the swirler 130 and the outlet 114 of the chamber 110. The fluid channels 144 can be in fluid communication with the interior of the chamber 110 through elongated slots 118 formed in the chamber wall.

As the inertia of at least some of the droplets causes them to separate from the spiral air flow, the droplets can move to the inner wall of the chamber 110 and collect into a liquid film that flows or streams along the inner wall of the chamber 110 in a spiral pattern. The liquid film flowing along the chamber wall can fall into any one of the fluid channels 144 of the segmented collector 140. In some embodiments, the swirler vanes, the chamber wall, and/or the collectors can have grooves or surface features like bumps or texture (not shown) to control and guide the liquid film. Techniques such as additive manufacturing, among others, can be used to create any surface feature. In some embodiments, one or more of the constituent collectors 140a, 140b, 140c, and 140d can include a skimmer 146a, 146b, 146c, and 146d (collectively skimmers 146) that projects into the chamber 110 from an edge of a respective slot 118. In the illustrated embodiment, the skimmers 146 are planar bodies or projections that are obliquely angled in a direction opposite the flow of the liquid film. The skimmers 146 can serve as a guide to turn the liquid film into the respective fluid channels 144 of the collectors 140. A pump (e.g., pump 150 of FIG. 2B) or other suction source can be used to suction the liquid film out the fluid channels 144 through a hose or other fluid tubing 154b for recirculation through the system (not shown) and the heat exchange system 100.

Although the segmented collector 140 shown in the illustrated embodiment includes four collector components 140a, 140b, 140c, and 140d, the collector 140 can include more or less than four collector components. For example, in some embodiments, the number of collector components can be determined to extend around the entire circumference of the chamber 110, sometimes referred to as a "fully populated" collector.

FIG. 5 is an illustration that models an exemplary flow path of a field of droplets through the droplet heat exchange system 100 of FIG. 2A. In some embodiments, the droplet heat exchange system 100 can reject approximately 13 kilowatts of heat from a droplet field to the surrounding air that flow at a rate of approximately 20 meters per second (m/s) and having an air temperature of approximately 275 Kelvin (K) (i.e., approximately 35° F. or approximately 2° C.). Additionally, the droplet heat exchange system 100 can have a collection rate that is greater than approximately 90% for droplets having variable sizes in the range of approximately 1 micrometer in diameter to about 1000 micrometers in diameter. More particularly, as shown, as the droplet diameter increases, the collection rate increases, with the collection rate for droplets having a diameter of approximately 1 micrometer being about 97% in one, non-limiting embodiment, and the collection rate for droplets having a diameter of approximately 10 micrometers, approximately 100 micrometers, and approximately 1000 micrometers being about 100% for that same one, non-limiting embodiment. These collection rates are exemplary and not intended to be limiting. One skilled in the art will recognize that the amount of heat rejection and collection rates can depend on a variety of factors, including but not limited to air flow rates, air temperature, air density, droplet flow rates, droplet temperature, and droplet size. The amount of heat rejection and collection rates can also change for different fluids that are used to produce the liquid droplets and gas. As previously discussed, in some embodiments, a fluid other than a gas can be used to effect thermal energy exchange in the system.

FIGS. 6A and 6B are schematic illustration of another exemplary embodiment of a swirler 230 suitable for use in the droplet heat exchange system of FIG. 2A. In the illustrated embodiment, the swirler 230 includes four twisted vanes or blades 232a, 232b, 232c, and 232d (collectively 232) that extend radially outward from a central elongated body or shaft 234. In some embodiments, a nose cone 236 can be disposed at one end of the elongated shaft 234 to help guide axial air flow towards the leading edges of the vanes 232 and/or reduce air turbulence. Alternatively, or additionally, a nose cone 238 can be disposed on the at the opposite end of the elongated shaft 234 to help provide air flow control and/or reduce air turbulence. Except as described below, or as will be readily appreciated by one skilled in the art, the twisted vanes 232, shaft 234, and nose cones 236 and 238 can be substantially similar to the twisted vanes 132, the elongated shaft 134, and the nose cones 136 and 138 described above with respect to FIGS. 3A-3E. A detailed description of the structure and function thereof is thus omitted for the sake of brevity. The swirler 230 can include any combination of the features of the swirler 130 described above and/or other features derivable by a person skilled in the art in view of the present disclosures.

In the illustrated embodiment, each of the vanes 232 is configured to have an aerodynamic or other non-uniform cross-sectional shape along a substantial length, if not the entire length, of the vane. An advantage of the aerodynamic shape of the vanes 232 can include reducing, if not avoiding, separation of air flow from the vanes as air flows through the swirler 232 and thereby improves the characteristic spiral pattern of the air flow. In the illustrated embodiment, the vane 232a can have an aerodynamic cross-sectional profile of an airfoil that extends along the entire length of the vane between the leading edge 232a' and the trailing edge 232a". Vanes 232b, 232c, and 232d can also have the same or a similar aerodynamic cross-sectional profile that extends along their respective lengths. In some embodiments, the aerodynamic cross-sectional profile of the vanes 232 can be an airfoil defined according to one or more of the numerical codes set forth by the NACA, such as the NACA codes provided above.

Figure 7A:
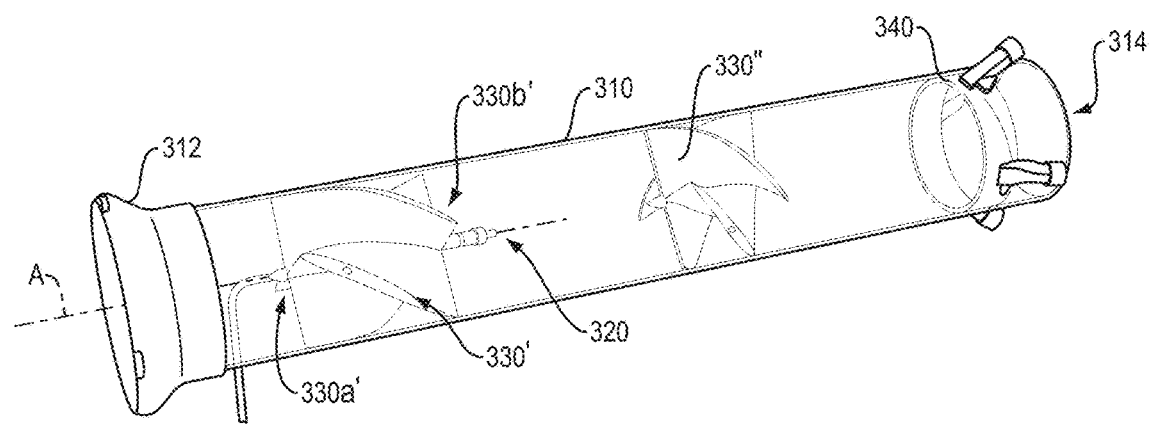
FIG. 7A is a perspective view of one exemplary embodiment of a droplet heat exchange system including a heat exchange chamber that contains an injector, multiple swirlers, and a collector.
Figure 7B:
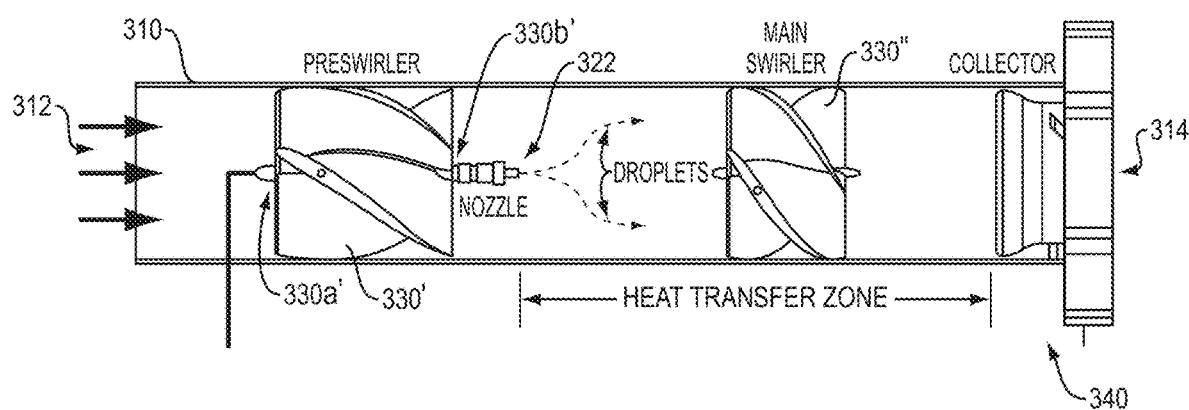
FIG. 7B is a side view of the droplet heat exchange system of FIG. 7A.

FIGS. 7A and 7B are schematic illustrations of another exemplary embodiment of a droplet heat exchange (DHX) system 300. In the illustrated embodiment, the DHX system 300 includes a heat exchange chamber 310 that includes an injector 320, a first swirler 330', a second swirler 330", and a collector 340. The heat exchange chamber 310 can have a gas inlet 312 and a gas outlet 314 disposed at opposing ends of the chamber. Except as described below, or as will be readily appreciated by one skilled in the art, the heat exchange chamber 310, the injector 320, and the swirlers 330' and 330" can be substantially similar to the heat exchange chamber 110, the injector 120, and the swirler 130 of the heat exchange system 100 described above with respect to FIGS. 2A-7A. A detailed description of the structure and function thereof is thus omitted for the sake of brevity.

In the illustrated embodiment, the first swirler 330', sometimes referred to herein as the pre-swirler, is disposed between the gas inlet 312 of the chamber 310 and the injector 320. The second swirler 330", sometimes referred to herein as the post-swirler, is disposed between the injector 320 and the collector 340. By disposing the pre-swirler 330' before the injector 320, the axial air flow entering the chamber through the gas inlet 312 can transition into a spiral air flow with a defined swirl pattern over a shorter range of distances.

In some embodiments, the injector 320 can be integrated directly into the pre-swirler 330'. For example, in the illustrated embodiment, the injector 320 can include a nozzle 322 that projects from the rear 330b' of the pre-swirler 330' to face the front 330a" of the post-swirler 330". In some embodiments, the nozzle 322 can be aligned with a central axis A-A of the pre-swirler 330'. The working fluid can be supplied from an external pump (e.g., pump 150 of FIG. 2B) via a hose or other fluid tubing 152a through a fluid port (not shown) disposed at the front 330a' of the pre-swirler 330'. By integrating the nozzle 322 into the pre-swirler 330', the pre-swirler itself can serve as a support stand, thereby reducing the overall mass of the heat exchange system 300. Alternatively, or additionally, the injector 320 can be integrated into the wall of the chamber 310, any nose cone or vane of the swirler 330', or the inlet 312.

Figure 9A:
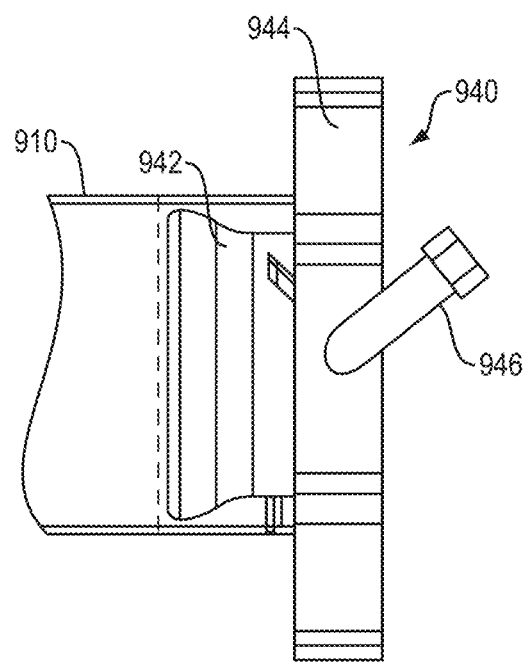
FIG. 9A is a side view of another exemplary embodiment of a collector suitable for use in any of the droplet heat exchange systems of FIGS. 2A, 7A, and 8A.
Figure 9B:
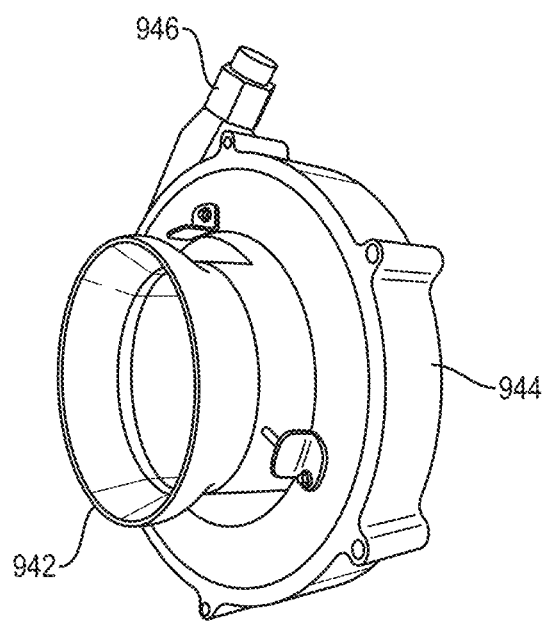
FIG. 9B is a perspective view of the collector of FIG. 9A.

In some embodiments, the collector 340 can be substantially similar to the segmented collector 140 of the heat exchange system 100 described above with respect to FIGS. 4A-4D. In other embodiments, the collector 340 can include a ring-shaped body. As described in more detail below with respect to FIGS. 9A and 9B, the ring-shaped body of the collector 340 can be configured to collect liquid droplets by skimming the liquid film off the inner wall of the chamber 310 and capturing liquid droplets that remain within the air flow prior to exiting the gas outlet 314. The collector 340 can be disposed at an end of the chamber 310 between the post-swirler 330" and the gas outlet 314 such that the air flow exits the chamber through the ring-shaped body of the collector 340. A pump (e.g., pump 150 of FIG. 2B) can be used to suction the liquid film out the collector 340, through a hose or other fluid tubing (e.g., 152b), for recirculation through the system (not shown) and the heat exchange system 100.

Figure 8A:
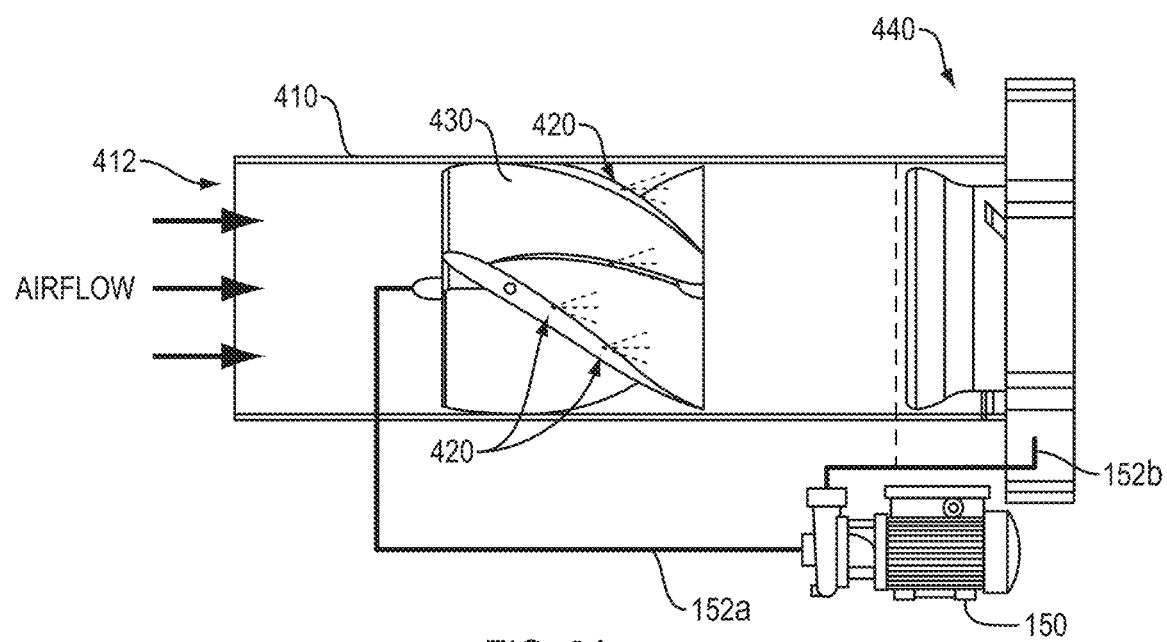
FIG. 8A is a side view of one exemplary embodiment of a droplet heat exchange system including a heat exchange chamber that contains an integrated injector and swirler, as well as a collector.
Figure 8B:
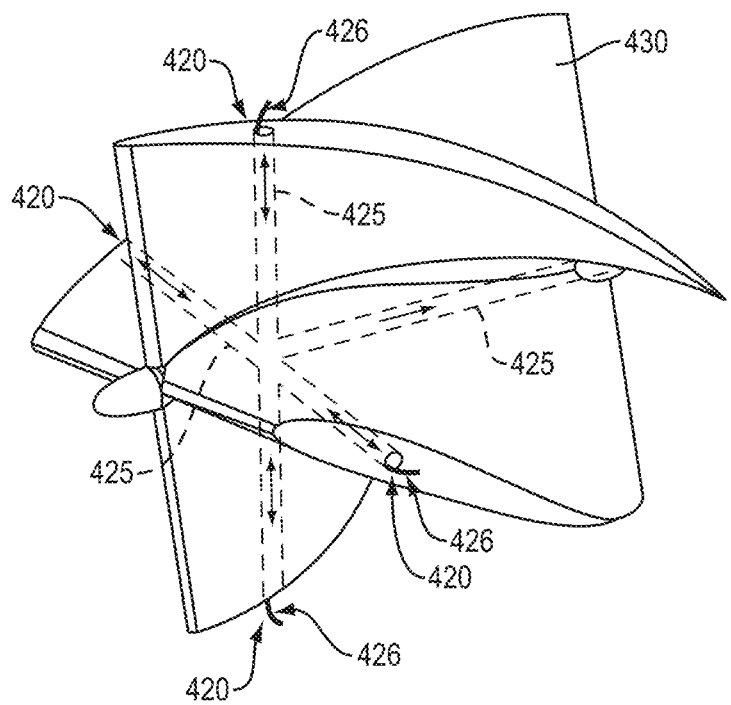
FIG. 8B is a perspective view of the integrated injector and swirler of FIG. 8A.

FIGS. 8A and 8B are schematic illustrations of another exemplary embodiment of a droplet heat exchange (DHX) system 400. In the illustrated embodiment, the DHX system 400 includes a heat exchange chamber 410 that includes a swirler 430 having multiple injector ports or nozzles 420 integrated directly into the body of the swirler, as well as a collector 440. The heat exchange chamber 410 can have a gas inlet 412 and a gas outlet 414 defined at opposing ends of the chamber 410.

Except as described below, or as will be readily appreciated by one skilled in the art, the heat exchange chamber 410, the swirler 430, and the collector 440 can be substantially similar to the heat exchange chamber 110, the swirler 130, and the segmented collector 140 of the heat exchange system 100 described above with respect to FIGS. 2A-7A. In some embodiments, the collector 440 can be substantially similar to the collector 940 described in more detail below with respect to FIGS. 9A-9D below Alternatively, the collector 440 can be implanted according to other collector designs suitable for use in connection with the present disclosure, such designs being derivable by a person skilled in the art in view of the present disclosure. Because of the similar features of the collectors, a detailed description of the structure and function of the collector 440 is omitted for the sake of brevity.

In the illustrated embodiment, the swirler 430 includes multiple injector ports 420 distributed about the body of the swirler 430 in a direction facing the collector 440. For example, in some embodiments, one or more of the injector ports 420 can be distributed along an edge of one or more of the vanes 432, e.g., the leading edge, the trailing edge, and/or the outer lateral edge. Additionally, or alternatively, in some embodiments one or more of the injector ports 420 can be distributed through any surface of one or more of the vanes 432 that faces the collector 440. Further, one or more fluid delivery channels 425 can be defined within the body of the swirlers and configured to fluidly couple the working liquid supplied from an external pump (e.g., pump 150 of FIG. 2B) to the injector ports 420 as shown in FIG. 8B. In some embodiments, one or more of the injector ports 420, such as those facing the inner wall of the chamber 310, can include a curved or slanted guide 426, sometimes referred to herein as a scoop. Each scoop 426 can be disposed at least partially over an opening to direct the field of liquid droplets towards an interior of the chamber 410.

In some embodiments, by distributing the injector ports 420 about the body of the swirler 430, one or more of a flow rate and a distribution of droplets dispensed into the chamber 430 can be controlled. For example, in some embodiments the injector ports 420 can be distributed about the body of the swirler 430 to dispense a droplet field that is approximately evenly distributed within the chamber. In some embodiments, the injector ports 420 can be individually activated to control the droplet flow rate into the chamber. For example, the droplet flow rate can be increased by increasing the number of active injector ports 420. Conversely, the droplet flow rate can be decreased by reducing the number of active injector ports. In some embodiments, the distributed injector ports 420 can be configured to spray smaller droplet sizes that transfer heat faster than larger droplet sizes. For example, in some embodiments the injector ports can be configured to spray droplets having small droplet sizes approximately in the range of about 1 micrometer in diameter to about 1000 micrometers in diameter. Thus, in such embodiments the distributed injector ports 420 can dispense droplets at increased flow rates sufficient to remove a desired amount of heat, and with smaller droplet sizes that facilitate faster heat transfers between droplets and surrounding air.

FIGS. 9A-9D are schematic illustrations of one exemplary embodiment of a collector 940 suitable for use in any of the droplet heat exchange systems 100, 300, and 400. As shown in the illustrated embodiment, the collector 940 has a ring-shaped skimmer 942 coupled to a liquid bin 944. The skimmer 942 has a leading edge 942a and a trailing edge 942c. In some embodiments the leading edge 942a of the skimmer 942 can have a diameter that substantially matches the inner wall of the heat exchange chamber 910, and the trailing edge 942c of the skimmer 942 can have a smaller diameter than the leading edge 942a. Further, the skimmer 942 can include a tapered portion 942b. The liquid bin 944 can include one or more fluid ports 946 configured to allow the liquid collected by the skimmer 942 to be suctioned out by a pump (e.g., pump 150 of FIG. 2B) through one or more hoses or fluid tubing (e.g., fluid tubing 152b of FIG. 2A).

Figure 9C:
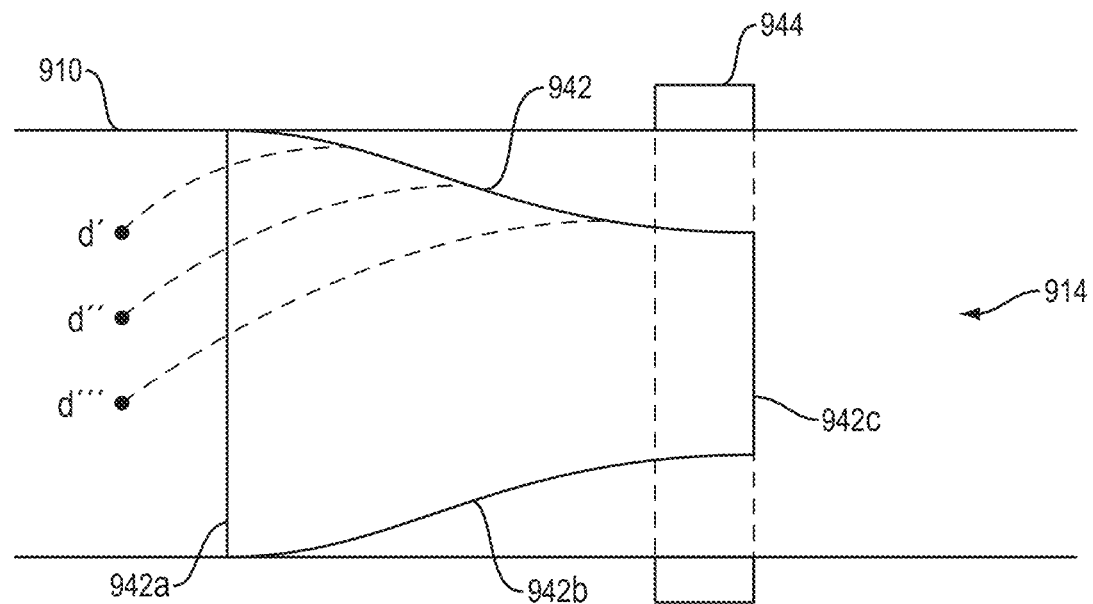
FIG. 9C is a side view of a skimmer of the collector of FIG. 9A.

As shown in FIG. 9C, in some embodiments droplets that collect into a flowing liquid film f along the inner wall of the chamber can be skimmed off the wall at the leading edge 942a of the skimmer and directed therethrough into the liquid bin 944. However, for droplets that remain within the spiral air flow, in some embodiments the tapered portion 942b of the skimmer 942 can be configured to have a cambered shape that allows such droplets to transition smoothly from the spiral gas flow into a liquid film along the inner surface of the skimmer. For example, as shown in FIG. 9C, smaller droplets (e.g., droplet d') may follow wider flow trajectories than larger droplets (e.g., droplet d" and d'"). Thus, in the illustrated embodiment, the camber or curvature of the tapered portion 942b can be configured to accommodate such differences in the flow trajectories of variable sized droplets. For example, droplets having wider flow trajectories can be captured and collected into a liquid film closer to the leading edge 942a of the skimmer, while droplets having narrower flow trajectories can be captured closer to the trailing edge 942c of the skimmer 942, thereby providing further improvement in droplet collection rates.

Figure 9D:
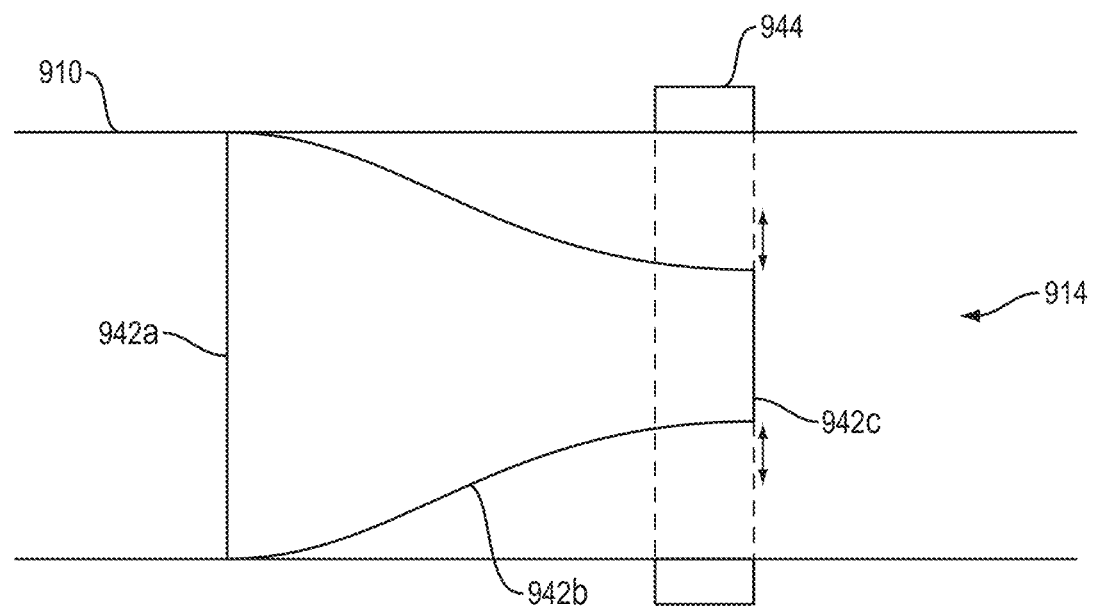
FIG. 9D is a side view of the skimmer of FIG. 9C.

In some embodiments, the ring shaped body of the skimmer 942 can define an opening that is configured to open and at least partially close based on the flow conditions of the droplet heat exchange system (e.g., 100, 300, and 400). For example, as shown in FIG. 9D, the ring shaped body of the skimmer 942 can be configured to flex in response to air flow passing therethrough to exit the gas outlet 914. This can be achieved in a variety of ways, including by having the body of the skimmer 942 configured to flex such that the diameter of the trailing edge of the skimmer 942c increases or decreases in response to a respective increase or decrease in air flow pressure. A person skilled in the art will recognize other configurations of the skimmer 942, and/or related components, that can be used to allow the skimmer 942 to flex in response to air flow passing therethrough to exit the gas outlet 914 without departing from the spirit of the present disclosure.

Figure 10:
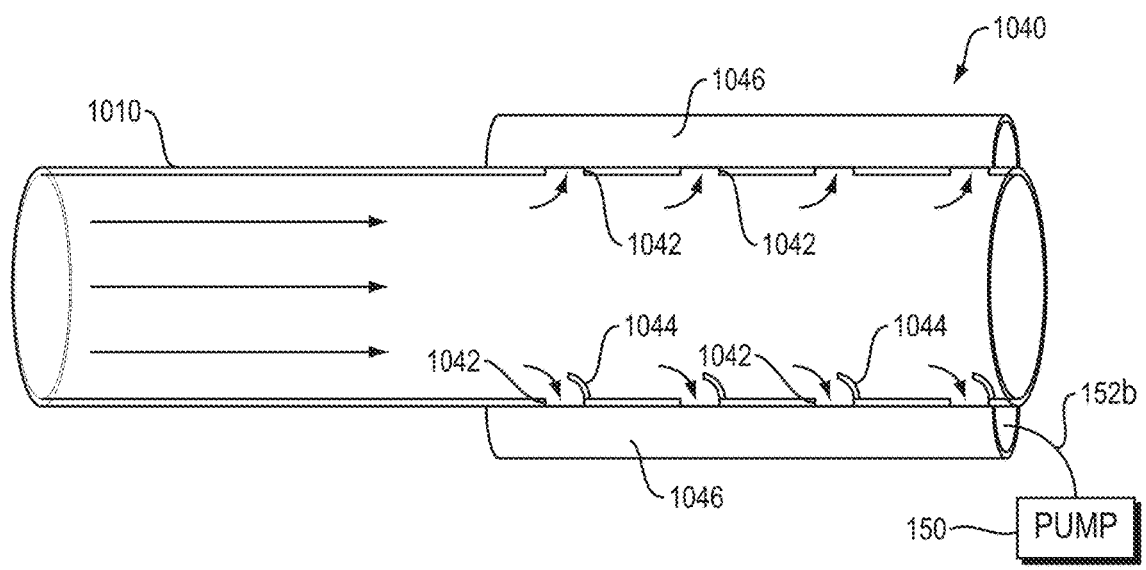
FIG. 10 is a schematic illustration of another exemplary embodiment of a collector suitable for use in any of the droplet heat exchange systems of FIGS. 2A, 8A, and 9A.

FIG. 10 is a schematic illustration of another exemplary embodiment of a collector 1040 suitable for use in any of the droplet heat exchange systems 100, 300, and 400. In some embodiments, the collector 1040 can include multiple spaced-apart collector holes 1042 that are formed in the wall of the heat exchange chamber 1010. Alternatively, or additionally, in some embodiments the collector holes 1042 can be partially covered by a scoop or hood 1044 that protrude from the wall of the chamber 1010, minimally into the air flow, thereby reducing drops in air pressure with the chamber 1010. For purposes of illustration only, the scoops or hoods 1044 partially covering the holes 1042 formed in the chamber wall can be conceptually similar to the cutting elements of a cheese grater.

An outer portion of heat exchange chamber in which the collector holes 1042 are formed can be encapsulated with a housing 1046. The housing 1046 can be coupled to an external pump (e.g., pump 150 of FIG. 2B) via a hose or fluid tubing 10 to generate a suction force through the collector holes 1042 to pull the liquid film out of the chamber for recirculation. An advantage of the collector 1040 can include control of the liquid film, allowing the device to modulate the desired film thickness as a function of operating performance. This can be done statically for the design by choosing a set number and placement of collector holes or dynamically by opening or closing holes during operation to get the desired film thickness and operating performance.

Figure 11:
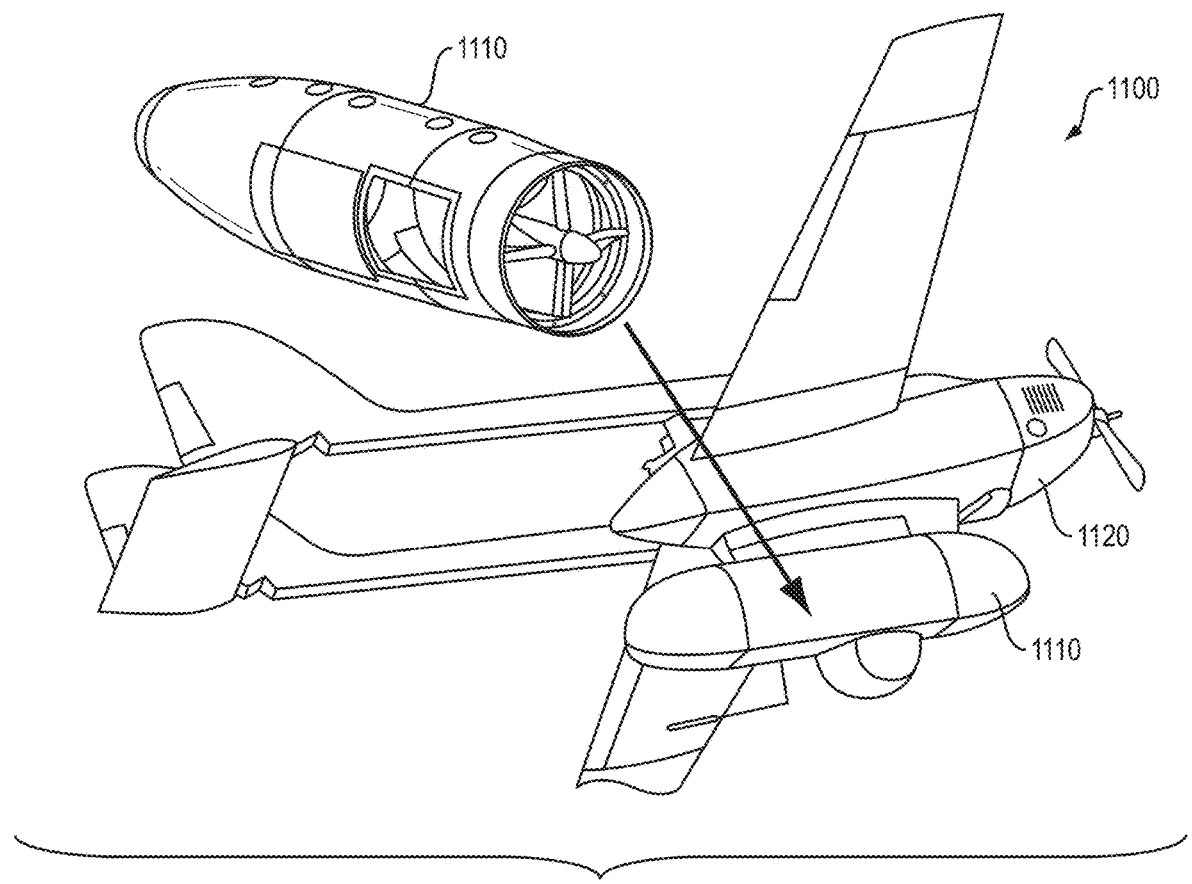
FIG. 11 is a schematic illustration of one exemplary embodiment of an aircraft capable of being equipped with any of the droplet heat exchange systems of FIGS. 2A, 8A, and 9A.

FIG. 11 is a schematic illustration of one exemplary embodiment of an aircraft 1100 capable of being equipped with a droplet heat exchange system. The droplet heat exchange system can be any one of the previously described DHX systems 100, 300, and 400, as well as other droplet heat exchange systems derivable from the present disclosures. As shown in the illustrated embodiment, one of the embodiment DHX systems (e.g., 100, 300, or 400) can be disposed within a pod or other housing construct 1110 below the fuselage 1120 of the aircraft 1100. However, one skilled in the art will recognize that the DHX system(s) of the present disclosure can be disposed elsewhere on or within the aircraft provided that the system has access to sufficient air flow.

Exemplary aircraft can include, without limitation, airplanes, helicopters, airships, unmanned aerial vehicles (UAVs), drones, or other machines adapted to fly. Although the disclosures provided for herein describe a particular application of the exemplary embodiments of a DHX system, namely rejection of excess heat from payloads in aircraft, a person skilled in the art will understand how such disclosures can be adapted to reject excess heat in other systems or platforms without departing from the spirit of the present disclosure. For example, the exemplary embodiments of the DHX system can be adapted for thermal management in ground systems, including vehicles (e.g., race cars), watercraft (e.g., high speed boats), cooling towers for nuclear power plants, wind turbines, and other machines capable of generating or having access to air flow.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein. All publications and references cited herein are expressly incorporated herein by reference in their entirety.

What is claimed is:

1. A droplet heat exchange system, comprising:
a heat exchange chamber configured to have gas flow into the chamber through at least one inlet and flow out of the chamber through at least one outlet;
at least one injector disposed within the heat exchange chamber and configured to dispense liquid droplets into the heat exchange chamber for thermal energy exchange with gas that flows through the heat exchange chamber;
at least one swirler disposed within the heat exchange chamber and having a body that is configured to form a spiral gas flow that pushes liquid droplets from the at least one injector radially outward as gas flows across the body, thereby separating the liquid droplets from the gas flowing across the body of the at least one swirler and forming a liquid film along an inner wall of the chamber; and
at least one collector in fluid communication with the heat exchange chamber and configured to collect the liquid film after thermal energy exchange occurs between the liquid droplets and gas that flows through the heat exchange chamber, the at least one collector being further configured to direct at least some of the collected liquid film to the at least one injector for subsequent use.

2. The system of claim 1, wherein the at least one swirler has a helical-shaped body that comprises an elongated body having one or more twisted vanes that extend radially outward from the elongated body, wherein the one or more twisted vanes are shaped to form a spiral gas flow as gas flows through the at least one swirler.

3. The system of claim 2, wherein the one or more twisted vanes can have an airfoil-shaped cross section.

4. The system of claim 1, wherein the body of the at least one swirler is stationary.

5. The system of claim 1, wherein a swirler of the at least one swirler is disposed between the at least one injector and the at least one collector.

6. The system of claim 1, wherein a swirler of the at least one swirler is disposed between the inlet of the heat exchange chamber and the at least one injector.

7. The system of claim 1, wherein the at least one swirler comprises:

a first swirler disposed between the inlet of the heat exchange chamber and the at least one injector; and a second swirler disposed between the at least one injector and the at least one collector.

8. The system of claim 1, wherein an injector of the at least one injector protrudes from a central axis of a swirler of the at least one swirler.

9. The system of claim 1, wherein an injector of the at least one injector is integrated into a swirler of the at least one swirler and is configured to dispense liquid droplets through injection ports defined in the body of the swirler.

10. The system of claim 1, wherein a collector of the at least one collector comprises an elongated body and a fluid channel defined therein, the fluid channel being in communication with an interior of the chamber through one or more slots defined in the chamber, and wherein the collector is configured to be disposed on an outer surface of the chamber such that the fluid channel extends longitudinally between the swirler and the outlet of the chamber.

11. The system of claim 10, wherein the at least one collector comprises a plurality of collectors disposed substantially around the circumference of the chamber.

12. The system of claim 1, wherein a collector of the at least one collector comprises a ring-shaped body having a tapered portion, wherein the tapered portion is configured to allow liquid droplets of varying droplet sizes to transition smoothly from the spiral gas flow into a liquid film that forms along an inner surface of the tapered portion of the collector.

13. The system of claim 12, wherein the collector comprises one or more output ports in fluid communication with a pump, and wherein the system is configured such that the liquid film is drawn out of the collector through the one or more output ports, into the pump.

14. The system of claim 12, wherein the ring-shaped body comprises an opening configured to selectively open and close based on flow conditions of the droplet heat exchange system.

15. The system of claim 1, wherein the heat exchange system is integrated into an aircraft.

16. The system of claim 1, wherein one or more of the at least one inlet, the at least one outlet, or the heat exchange chamber comprises a material that deforms to modulate an operating parameter, and wherein the operating parameter includes a gas flow rate.

17. The system of claim 1, wherein one or more of the at least one inlet, the at least one outlet, and the heat exchange chamber comprises a material that deforms in response to a change in an operating condition to maintain a target operating parameter, and wherein the operating condition includes a pressure and the target operating parameter includes a gas flow rate.

18. The system of claim 1, wherein one or more of the heat exchange chamber, the at least one swirler, and the at least one collector comprises a material that collapses for storage.

19. The system of claim 1, wherein grooves or surface features are defined in one or more surfaces of at least one of the heat exchange chamber, the at least one swirler, or the at least one collector to guide liquid film.

20. The system of claim 1, further comprising a pump to suction the collected liquid film for recirculation.

* * * * *